(12) United States Patent
Qian et al.

(10) Patent No.: US 11,703,401 B2
(45) Date of Patent: Jul. 18, 2023

(54) MEASURING DEVICE AND MEASURING METHOD FOR MEASURING UNBALANCED MOMENT OF BOTTOM SURFACE OF CIRCULAR VALVE CORE

(71) Applicant: ZHEJIANG UNIVERSITY, Hangzhou (CN)

(72) Inventors: Jinyuan Qian, Hangzhou (CN); Congwei Hou, Hangzhou (CN); Juan Mu, Hangzhou (CN); Zhijiang Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/253,632

(22) PCT Filed: May 12, 2020

(86) PCT No.: PCT/CN2020/089876
§ 371 (c)(1),
(2) Date: Dec. 18, 2020

(87) PCT Pub. No.: WO2020/233458
PCT Pub. Date: Nov. 26, 2020

(65) Prior Publication Data
US 2022/0057276 A1 Feb. 24, 2022

(30) Foreign Application Priority Data
May 17, 2019 (CN) .......................... 201910412747.0

(51) Int. Cl.
*G01L 1/08* (2006.01)
*G01M 1/14* (2006.01)
(52) U.S. Cl.
CPC .............. *G01L 1/083* (2013.01); *G01M 1/14* (2013.01)

(58) Field of Classification Search
CPC ........................................................ G01L 1/083
See application file for complete search history.

(56) References Cited

U.S. PATENT DOCUMENTS

| 2010/0212422 A1* | 8/2010 | Allen | G01M 1/22 |
| | | | 702/56 |
| 2015/0107375 A1* | 4/2015 | Stanley | G01M 1/14 |
| | | | 73/862.61 |

FOREIGN PATENT DOCUMENTS

| CN | 107300440 A | 10/2017 |
| CN | 109596247 A | 4/2019 |

(Continued)

OTHER PUBLICATIONS

International Search Report (PCT/CN2020/089876); dated Aug. 13, 2020.

*Primary Examiner* — Paul M. West
*Assistant Examiner* — Mark A Shabman
(74) *Attorney, Agent, or Firm* — W&G Law Group (57) ABSTRACT

Provided are a device and a measuring method for measuring an unbalanced moment on a bottom surface of a circular valve core. The device includes a diverging shaped tube, a water tank, a transparent tube, spring dynamometers, laser sources, a circular valve core, and a high-speed camera with a camera stand. Inner shackles and the laser sources are evenly distributed on an outer side of the circular valve core of the device, the spring dynamometers are connected with the inner shackles and with the outer shackles evenly distributed on an inner wall of the transparent tube. The method records an unbalanced state of the circular valve core under an impact of water flow from different orientations with the high-speed camera on the camera stand, the location of the laser point on the outer wall and a tension (Continued)

force of the spring dynamometer are read to calculate a torque of the circular valve core.

10 Claims, 3 Drawing Sheets

(56) References Cited

FOREIGN PATENT DOCUMENTS

| | | | |
|---|---|---|---|
| CN | 110132455 A | 8/2019 | |
| WO | WO-2015043154 A1 * | 4/2015 | ............... G01F 1/54 |

* cited by examiner

MEASURING DEVICE AND MEASURING METHOD FOR MEASURING UNBALANCED MOMENT OF BOTTOM SURFACE OF CIRCULAR VALVE CORE

TECHNICAL FIELD

The present disclosure relates to an experimental measuring device and a measuring method, and particularly, to a measuring device for measuring an unbalanced moment on a bottom surface of a circular valve core.

BACKGCIRCULAR

In a horizontally arranged valve, pressure distribution is unbalanced at a bottom surface of a piston circular valve core thereof, and a high-pressure area shifts to a right side (close to an outflow direction). However, since pressure distribution on an upper surface of the piston circular valve core is balanced, a pressure difference combining force formed by a pressure difference of the upper and lower surfaces will deviate from a central axis line of the piston valve core to generate an unbalanced moment and cause a wall surface of the piston valve core to squeeze against a sealing member, thereby increasing drive energy consumption and affecting a sealing performance, and even affecting leakage failure of the valve under high flow-rate conditions. In this regard, it is require to provide a measuring device for measuring the unbalanced moment of the bottom surface of the circular valve core to study the unbalanced moment of the bottom surface of the circular valve core, in order to investigate a mechanism of its formation and a method to eliminate this phenomenon.

Currently, there is no device specifically for measuring the unbalanced moment at the bottom of the circular valve core on the domestic market. Chinese invention patent CN103115706B discloses a detection device and its detection method for flat scroll spring torque, the device is provided with a rotating mandrel on which a spring positioning sleeve is sleeved, a spring to be detected is sleeved on the spring positioning sleeve, a lever and a pointer are assembled between the spring positioning sleeve and a dial, an end of the lever is connected with the dynamometer, an end of the rotating mandrel is connected with a handle assembly, the handle assembly includes a spring deflector and a pointer deflector, the spring deflector is clamped with the spring to be detected, and a pointer is in contact with the pointer deflector. A device system is relatively complete, but it cannot measure a torque of the circular valve core under an impact of a flow field.

Among tools available on the market for measuring force or moment, springs are commonly used for measurement. Chinese invention application CN104778880A discloses spring dynamometers, the device includes a support table, spring dynamometers and a weight; the support table includes a main support stand, a secondary support stand and an auxiliary support stand. Such a device solves the problem of fixing and supporting between the secondary support stand and the auxiliary support stand, but it cannot be applied to the flow field to measure an impact force subjected by the circular valve core.

SUMMARY

In view of the problems of lacking of experimental devices on the market for measuring the unbalanced moment of the bottom surface of the circular valve core, and complex structure and difficult manufacturing of existing devices for measuring torque or force, suitable application in flow fields, the present disclosure provides a measuring device for the unbalanced moment on the bottom surface of the circular valve core is proposed, and a measuring method for the unbalanced moment is proposed related to this device, in order to achieve a more accurate measurement of the unbalanced moment on the bottom surface of the circular valve core.

In order to achieve the above objects, the present disclosure specifically adopts following technical solutions.

A measuring device for measuring an unbalanced moment of a bottom surface of a circular valve core, includes a diverging shaped tube, a water tank, a transparent tube, spring dynamometers, laser sources, a circular valve core, and a high-speed camera. The circular valve core is placed in the vertical transparent tube, positioning scales are marked on and along an outer wall of the transparent tube; a plurality of inner shackles is evenly distributed at the same height of a side wall of the circular valve core at equal angles along a circumferential direction, and each of the laser sources are fixed on the side wall of the circular valve core directly above a corresponding one of the inner shackles; the laser sources directly above the inner shackles are located at a same height of the side wall of the circular valve core, straight lines of laser emission directions of the respective laser sources all pass through a circle center of a cross-section of the circular valve core where all the laser sources are located; outer shackles respectively corresponding to the inner shackles are evenly distributed at a same height of an inner wall of the transparent tube at equal angles along the circumferential direction, the inner shackles and the outer shackles are paired in pairs, and each pair of one inner shackle and one outer shackle are connected by a corresponding one of the spring dynamometers that is tensioned. When a central axis line of the circular valve core coincides with a central axis line of the transparent tube without tilting and twisting, all the spring dynamometers are center-symmetrically distributed, and a tension force direction of each of the spring dynamometers is parallel to the laser emission direction of a corresponding one of the laser sources directly above it. A tapered end of the diverging shaped tube serves as a water inlet, and a diverging end is smoothly communicated with a bottom of the transparent tube. The high-speed camera is placed outside of the transparent tube and configured to surround the transparent tube along the circumferential direction, to image postures of the circular valve core and the spring dynamometers in the tube at different orientations.

Preferably, a number of the spring dynamometers, a number of the outer shackles, a number of the inner shackles and a number of the laser sources are all equal to 20.

Preferably, the diverging shaped tube has an arcuate shape to allow water to enter horizontally and to flow out vertically upwards.

Preferably, the bottom surface of the circular valve core is provided with a plurality of bolt holes configured to fix an additional layer of the bottom surface of the valve core.

Preferably, the bottom surface of the circular valve core is provided with a plurality of bolt holes configured to fix an additional layer of the bottom surface of the valve core.

Preferably, the high-speed camera is erected on a camera stand.

Preferably, a top of the transparent tube is communicated with the water tank.

Preferably, all the spring dynamometers are the same in terms of model and size, and when the central axis line of the circular valve core coincides with the central axis line of the transparent tube without tilting and twisting, all the spring dynamometers exert a same tension force on the circular valve core.

Preferably, the transparent tube is an acrylic tube.

Another object of the present disclosure is to provide a measuring method for measuring an unbalanced moment on a bottom surface of a circular valve core using the measuring device according to any solution above. The method includes the following steps: a step 1) of installing the circular valve core to be measured in the measuring device in such a manner that the circular valve core is suspended in the transparent tube under tension forces of the spring dynamometers, and the central axis line of the circular valve core coincides with the central axis line of the transparent tube without tilting and twisting; a step 2) of keeping all the spring dynamometers (2) on a same horizontal surface, and recording current readings $F_0$ of all the spring dynamometers (2); a step 3) of feeding water into the transparent tube (1) through the diverging shaped tube (6) to impact the bottom surface of the circular valve core (4) by a water flow, until the circular valve core (4) reaches a stable state, using the high-speed camera (8) at a height directly and horizontally facing the circular valve core (4) to image, at different orientations around the transparent tube (1) in the circumferential direction, postures of the circular valve core (4) and the spring dynamometers (2); simultaneously recording a reading $F'_n$ of each of the spring dynamometers (2) and a reading $b_n$ of the positioning scale of laser light emitted by each of the laser sources (11) on the outer wall of the transparent tube (1); a step 4) of obtaining, from the images of the high-speed camera (8) at different orientations, an angle $\beta_n$ between each of the spring dynamometers (2) and a vertical direction; simultaneously selecting, from the images, two of the laser sources that are located at two diameter ends in the cross-section of the circular valve core (4), and horizontally moving a point where a connecting line of the two laser sources intersects the central axis line of the valve core to a tube wall of the transparent tube and reading a reading a; a step 5) of finding out $b_n$ with a largest difference from a and recoding it as $b_{max}$, and taking a orientation where the $b_{max}$ is obtained as a orientation in which the circular valve core (4) is twisted, in the image of the high-speed camera (8) corresponding to the orientation, obtaining a distance l between the outer wall of the transparent tube (1) and a circle center O of the cross-section of the circular valve core (4) where all the inner shackles (9) are located, then obtaining a torsion angle $\alpha$ of the circular valve core (4) according to a formula (1), and the torsion angle $\alpha$ being smaller than 90°:

$$\alpha = \arctan\left(\frac{b_{max} - a}{l}\right); \quad (1)$$

a step 6) of calculating a component force $F_{1n}$ in a vertical direction of each of the spring dynamometers (2) according to a formula (2):

$$F_{1n} = F_n \times \cos \beta_n \quad (2)$$

where $F_n = F'_n - F_0$;

a step 7) of measuring an angle $\gamma_n$ between a radius where each of the spring dynamometers (2) is located and a torsion central axis of the circular valve core (4), wherein the angle $\gamma_n$ is smaller than 90°, the radius where each of the spring dynamometers (2) is located is a connecting line between the circle center O and the inner shackle (9) connected to the spring dynamometer (2); calculating, according to a formula (3), a vertical distance $L_n$ between each of the spring dynamometers (2) and a vertical plane where the torsion central axis is located:

$$L_n = R \times \sin \gamma_n \times \cos \alpha \quad (3)$$

where R is a radius of the cross-section of the circular valve core (4); and a step 8) of obtaining a total torque of the circular valve core (4) by adding a torque generated by each of the spring dynamometers on a same side of the torsion central axis according to a formula (4).

$$T = F_{11} \times L_1 + F_{12} \times L_2 + \ldots + F_{1n} \times L_n \quad (4).$$

The above technical solution of the present disclosure has following advantages compared with the related art:

(1) the measuring device for the unbalanced moment on the bottom surface of the circular valve core according to the present disclosure masterly and indirectly reflects, through a flip angle of the valve core and magnitudes of the tension force at different positions outside of the valve core, abstract moment distribution on the bottom surface of the valve core, and then calculates the torque of the circular valve core about a certain torsion central axis through an force analysis and calculation formulas.

(2) The measuring device for the unbalanced moment on the bottom surface of the circular valve core according to the present disclosure has strong pertinence, compact structure, simple manufacture and low cost.

BRIEF DESCRIPTION OF DRAWINGS

In order to explaining the present disclosure, the present disclosure will be further described in detail below in conjunction with the accompanying drawings and embodiments.

Reference signs: 1. transparent tube; 2. spring dynamometer; 3. outer shackle; 4. circular valve core; 5. additional layer of bottom surface of valve core; 6. diverging shaped tube; 7. camera stand; 8. high-speed camera; 9. inner shackle; 10. water tank; 11. laser source.

DESCRIPTION OF EMBODIMENTS

The present disclosure will be further explained below in conjunction with the drawings.

Figure 1:
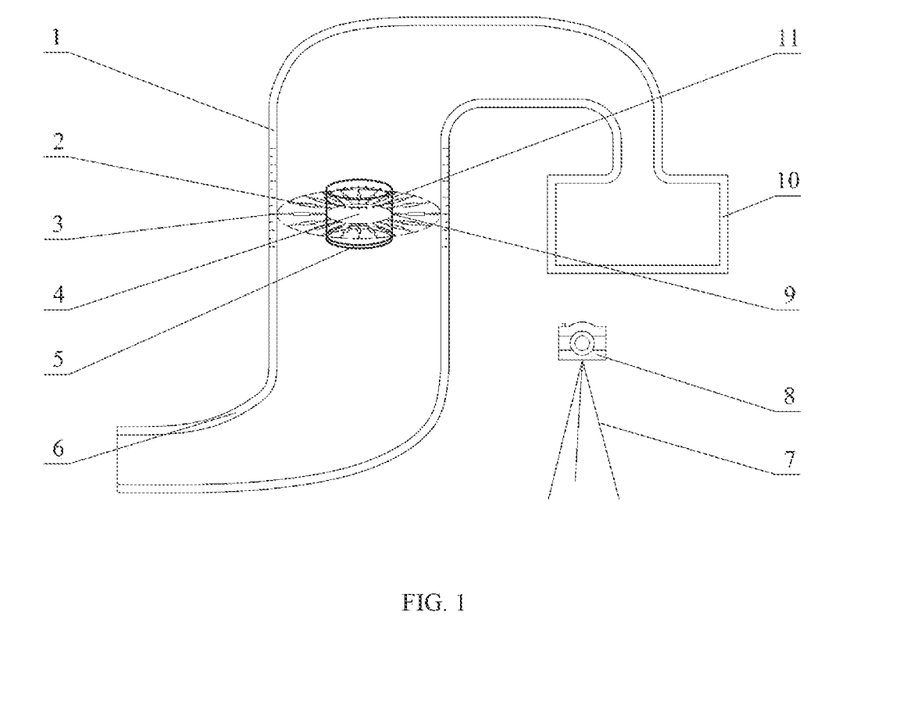
FIG. 1 is a schematic diagram of a measuring device for measuring an unbalanced moment on a bottom surface of a circular valve core.

As shown in FIG. 1, in this embodiment, a measuring device for measuring an unbalanced moment of a bottom surface of a circular valve core includes a diverging shaped tube 6, a water tank 10, a transparent tube 1, spring dynamometers 2, laser sources 11, a circular valve core 4 and a high-speed camera 8.

The transparent tube 1 is a transparent acrylic tube, and conditions inside of the tube can directly observed. The transparent tube 1 is arranged to be vertical to a horizontal plane, and the circular valve core 4 to be measured is placed in the vertical transparent tube 1. In addition, a tube diameter of a main portion of the transparent tube 1 is uniform, and an inner wall is smooth, to avoid generating water flow fluctuations. An outer wall of the transparent tube 1 is marked with positioning scales along the way. Generally, one scale is 5 mm, to facilitate measurement of a position of an outside laser source projected on the transparent tube 1 when the circular valve core 4 is turned over. The circular valve core 4 is cylindrical, 20 inner shackles 9 are evenly distributed at equal angles in a circumferential direction on the same height of the side wall of the circular valve core 4, and one laser source 11 is fixed on the side wall of the circular valve core 4 directly above each inner shackle 9, and a total of 20 laser sources 11. Intervals between adjacent inner shackles 9 and adjacent laser sources 11 is 18°. The laser sources 11 directly above each of the inner shackles 9 are located at the same height on the side wall of the circular valve core 4, straight lines of laser emission directions of respective laser sources 11 all pass through a circle center of a cross-section of the circular valve core 4 where all the laser sources 11 are located, and the straight line where the laser emission direction is located is perpendicular to a central axis line of the circular valve core 4. In an actual measurement process, a power source of the laser source 11 is turned on. When the circular valve core 4 coincides with a central axis line of the transparent tube 1, and there is no tilting and twisting, the laser emission direction of each laser source 11 is horizontal, in this case, readings formed by lasers of different laser sources 11 being targeted on the positioning scales should be the same. When the circular valve core 4 is tilted and twisted, the laser emission direction of the corresponding laser source 11 will also be tilted accordingly, so as to change the reading formed by the laser being targeted on the positioning scales. Through the changes in the readings before and after the respective laser sources 11, a torsion direction and a torsion angle of the circular valve core 4 can be restored.

Figure 2:
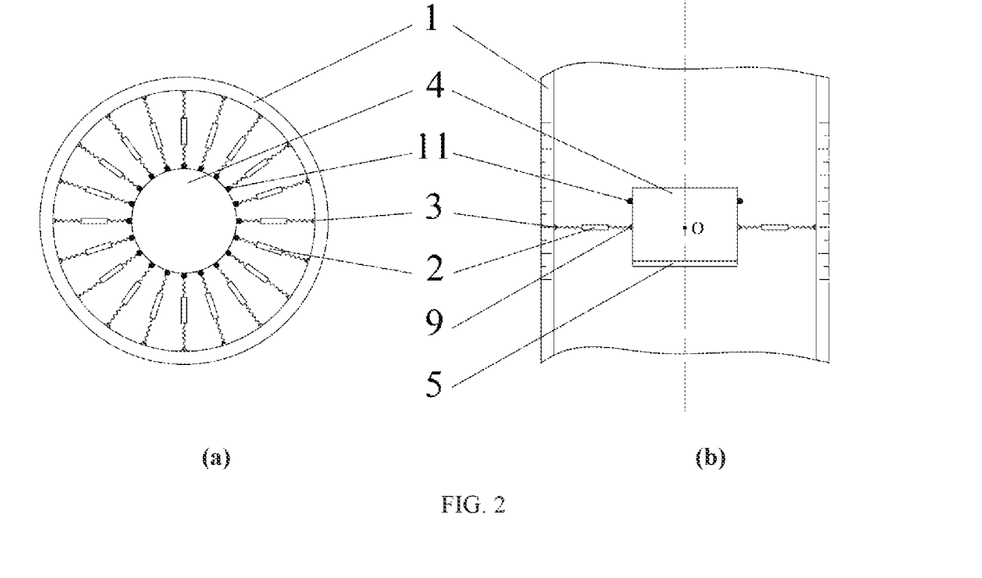
FIG. 2 is a top view and a front view of a circular valve core part of a device when there is no water flow impact, where (a) is the top view, and (b) is the top view.

In addition, calculation of the unbalanced moment also requires calculation of a force, and it is realized by the spring dynamometer 2 in this device. Specifically, as shown in FIG. 2, outer shackles 3 with the same number as the inner shackles 9 are evenly distributed at equal angles along the circumferential direction at the same height on the inner wall of the transparent tube 1, the inner shackles 9 and the outer shackles 3 are paired in pairs, and each pair of the inner shackle 9 and the outer shackle 3 are connected by a tensioned spring dynamometer 2. An inner diameter of the transparent tube 1 is greater than a sum of lengths of the two spring dynamometers 2 and the diameter of the circular valve core 4, to facilitate installation. In a case where the circular valve core 4 coincides with the central axis line of the transparent tube 1 without tilting and twisting, all the spring dynamometers 2 are center-symmetrically distributed, and a tension force direction of each spring dynamometer 2 is parallel to the laser emission direction of the laser source 11 directly above it. Without doubt, since the circular valve core 4 itself has a certain weight, the spring dynamometer 2 will have a certain tilting angle to overcome gravity of the circular valve core 4 to make it float. But as long as there are enough spring dynamometers 2 or an elasticity coefficient of the spring dynamometer 2 is large enough, the tilting angle can be almost ignored, and all spring dynamometers 2 can be approximately regarded as being on the same horizontal plane. In the present disclosure, the numbers of the spring dynamometer 2, the outer shackle 3, the inner shackle 9 and the laser source 11 are all 20, which can meet usage requirements, without doubt, the specific number can be adjusted appropriately if necessary. In this case, extension lines of respective spring dynamometers 2 pass through the circle center of the cross-section of the circular valve core 4 where all the inner shackles 9 are located. All spring dynamometers 2 have the same model and size, and in the case where the circular valve core 4 coincides with the central axis line of the transparent tube 1 without tilting and twisting, all the spring dynamometers 2 exert the same tension force on the circular valve core 4.

Two ends of the transparent tube 1 have a water inlet and a water outlet, the water inlet is on the bottom, the water outlet is on the top, inlet water flows through the circular valve core 4 in an upward flow, forming a water flow that impacts the bottom surface of the valve core, and the water flow generates water flow pushing on the bottom surface of the circular valve core 4. When there is an unbalanced moment on the bottom surface of the circular valve core 4, it will cause an uneven water flow pushing force at different positions on the bottom surface, forming a moment that turns over the circular valve core 4. The water inflow of the transparent tube 1 is realized through a diverging shaped tube 6, a tapered end of the diverging shaped tube 6 serves as a water inlet, and the diverging end is smoothly communicated with bottom of the transparent tube 1. Moreover, in order to prevent the water inflow from causing disturbance to the circular valve core 4, the diverging shaped tube 6 has an arcuate shape of approximately 90°, the water enters horizontally, and the water is flows out vertically upwards. Top of the transparent tube 1 is communicated with the water tank 10 through a 180° curved arc pipe, and the water flow from bottom to top is discharged into the water tank 10. In this embodiment, a pipe diameter of the large-diameter end of the diverging shaped tube 6 is 300 mm, for connecting the acrylic tube; a pipe diameter of the small-diameter end is 100 mm, for adding water to the acrylic tube. The diameter of the circular valve core 4 is 100 mm.

The high-speed camera 8 is placed outside of the transparent tube 1 and configured to surround the transparent tube 1 in a circumferential direction, to image postures of the circular valve core 4 and the spring dynamometer 2 in the tube at different orientations. The high-speed camera 8 can be erected on a camera stand 7, and a height of the camera stand 7 is preferably adjustable.

In addition, the bottom surface of the circular valve core 4 is provided with a plurality of bolt holes for fixing an additional layer 5 of the bottom surface of the valve core, and an object is to subsequently research on how to reduce the unbalanced moment on the bottom surface of the valve core so as to make changes to a structure of the bottom surface of the valve.

Figure 3:
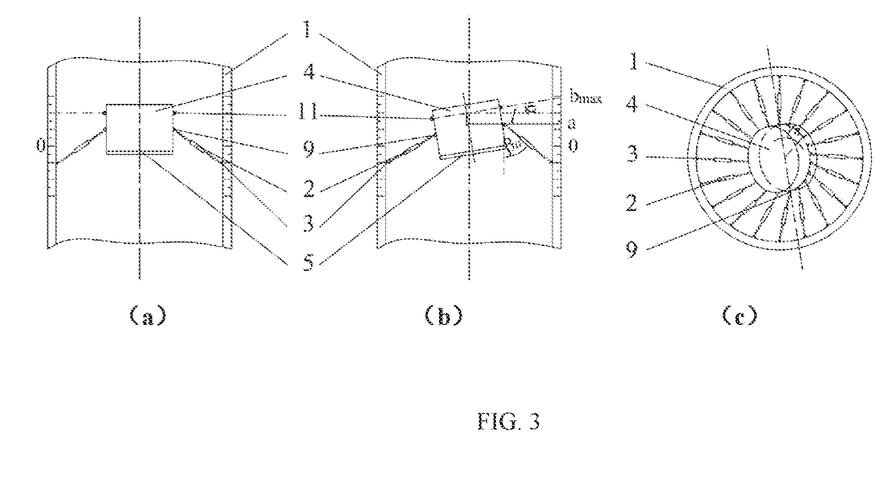
FIG. 3 is a top view and a front view of a circular valve core part of a device when a water flow impacts, where (a) is the front view of the circular valve core part without an unbalanced moment, (b) is the front view of the circular valve core part under an action of the unbalanced moment, and (c) is the top view of the circular valve core under the action of the unbalanced moment.

When the above device tests the unbalanced moment at the bottom of the circular valve core 4, the water enters from the small-diameter port of the diverging shaped tube 6, then enters the acrylic tube 1, and surges upwards to impact the bottom of the circular valve core 4 to form an unbalanced moment. As shown in FIG. 3(*a*), the circular valve core 4 first translates upwards when it is impacted by the water flow, and the spring dynamometer 2 receives a uniform force. Affected by the unbalanced moment, the circular valve core 4 is twisted, as shown in FIGS. 3(*b*) and 3(*c*), the force on the spring dynamometer 2 is uneven, and readings left by the laser sources 11 at different orientations on the outer wall of the acrylic tube 1 are different. After the water flow flows through the circular valve core 4, it enters the water tank 10.

A process of using this device to measure the unbalanced moment of the bottom surface of the circular valve core is as follows: placing the camera stand 7 in the circumferential direction of the transparent tube 1, and arranging into ring-shaped concentric circles according to angles of the 20 inner shackles on the outer side of the circular valve core 4 with the valve core circle point O being taken as the circle center. Mounting the high-speed camera 8 on the camera stand 7 to sequentially record an unbalanced state of the circular valve core 4 generated under the impact of the water flow in different orientations, and reading the scale of the laser source 11 on the outer wall and the tension force on the spring dynamometer 2; measuring the tilting angle of the circular valve core 4 in photos taken by the high-speed camera 8, and determining, according to the scales on the outer wall of the laser sources 11 at different orientations, the orientation in which the circular valve core 4 is twisted; measuring the angle of the spring dynamometer 2 in each orientation in the photos taken by the high-speed camera 8, and calculating its component force in the vertical direction; finally, calculating a torque of the circular valve core 4 about this torsion central axis with reference to the tilting angle of the circular valve core 4, a vertical component force of each spring dynamometer 2, and a vertical distance from each spring dynamometer 2 to the torsion central axis.

The method of measuring the unbalanced moment on the bottom surface of the circular valve core is described in detail below. The method includes the following steps:

a step 1) of installing the circular valve core 4 to be measured in the measuring device in such a manner that the circular valve core 4 is suspended in the transparent tube 1 under tension forces of the spring dynamometers 2, and the central axis line of the circular valve core 4 coincides with the central axis line of the transparent tube 1 without tilting and twisting;

a step 2) of keeping all the spring dynamometers 2 on a same horizontal surface, and recording current readings $F_0$ of all the spring dynamometers 2;

a step 3) of feeding water into the transparent tube 1 through the diverging shaped tube 6 to impact the bottom surface of the circular valve core 4 by a water flow, until the circular valve core 4 reaches a stable state, using the high-speed camera 8 at a height directly and horizontally facing the circular valve core 4 to image, at different orientations around the transparent tube 1 in the circumferential direction, postures of the circular valve core 4 and the spring dynamometers 2; simultaneously recording a reading $F'_n$ of each of the spring dynamometers 2 and a reading $b_n$ of the positioning scale of laser light emitted by each of the laser sources 11 on the outer wall of the transparent tube 1;

a step 4) of obtaining, from the images of the high-speed camera 8 at different orientations, an angle $\beta_n$ between each of the spring dynamometers 2 and a vertical direction; simultaneously selecting, from the images, two of the laser sources that are located at two diameter ends in the cross-section of the circular valve core 4, and horizontally moving a point where a connecting line of the two laser sources intersects the central axis line of the valve core to a tube wall of the transparent tube and reading a reading a;

a step 5): it is required to determine a direction in which the circular valve core 4 is deflected under the impact of the water flow. When the bottom of the circular valve core 4 receives the impact of the water flow, it first moves up horizontally, then under an action of the unbalanced moment, it is twisted in a certain direction. Recording the scale a of the circle center on the outer wall of the acrylic tube 1 through the unbalanced state of the circular valve core 4 taken in different orientations, and according to recording the scales of the outermost laser source 11 on the outer wall of the acrylic tube 1 at different orientations, finding out b with a largest difference from a and marking it as $b_{max}$, and taking the orientation where the $b_{max}$ is obtained by shooting as the orientation in which the circular valve core 4 is twisted, so as to determine a position of the torsion central axis, that is, the shooting direction of the high-speed camera corresponding to the $b_{max}$. In the image of the high-speed camera 8 corresponding to this orientation, measuring to obtain a distance l from the circle center O of the cross-section of the circular valve core 4 where all the inner shackles 9 are located to the outer wall of the transparent tube 1, then obtaining the torsion angle $\alpha$ of the circular valve core 4 according to a formula (1), and the torsion angle $\alpha$ is smaller than 90°:

$$\alpha = \arctan\left(\frac{b_{max} - a}{l}\right); \quad (1)$$

a step 6) of calculating a component force $F_{1n}$ in a vertical direction of each of the spring dynamometers 2 according to a formula 2:

$$F_{1n} = F_n \times \cos \beta_n \quad (2)$$

where, $F_n = F'_n - F_0$;

a step 7) of measuring an angle $\gamma_n$ between a radius where each spring dynamometer 2 is located and a torsion central axis of the circular valve core 4, in which the angle $\gamma_n$ is smaller than 90°, the radius where each spring dynamometer 2 is located is a connecting line between the circle center O and the inner shackle 9 connected to this spring dynamometer 2; according to a formula (3), calculating a vertical distance $L_n$ from each spring dynamometer 2 to the vertical plane where the torsion central axis is located:

$$L_n = R \times \sin \gamma_n \times \cos \alpha \quad (3)$$

where R is a radius of the cross-section of the circular valve core 4;

a step 8) of dividing the entire circular valve core into two left and right halves by the torsion central axis, a value of a sum of all spring torques on a right side should be the same as a sum of a sum of all spring torques on a left side. Therefore, according to a formula (4), a torque generated by each spring dynamometer on the same side of the torsion central axis (either side can be selected for calculation) is added, to obtain a total torque of the circular valve core 4:

$$T = F_{11} \times L_1 + F_{12} \times L_2 + \ldots + F_{1n} \times L_n \quad (4)$$

What is claimed is:

1. A measuring device for measuring an unbalanced moment of a bottom surface of a circular valve core, comprising:
    a diverging shaped tube (6);
    a water tank (10);
    a transparent tube (1);
    spring dynamometers (2);
    laser sources (11);
    a circular valve core (4); and
    a high-speed camera (8),
    wherein the circular valve core (4) is placed in the vertical transparent tube (1), positioning scales are marked on an outer wall of the transparent tube (1) and distributed along a length direction of the outer wall; a plurality of inner shackles (9) are evenly distributed on a side wall of the circular valve core (4) along a circumferential direction of the circular valve core (4), the inner shackles (9) are at the same height, and any pair of adjacent inner shackles (9) are spaced at equal angles, and each of the laser sources (11) are fixed on the side wall of the circular valve core (4) directly above a corresponding one of the inner shackles (9); the laser sources (11) directly above the inner shackles (9) are located at a same height of the side wall of the circular valve core (4), straight lines of laser emission directions of the respective laser sources (11) all pass through a circle center of a cross-section of the circular valve core (4) where all the laser sources (11) are located; outer shackles (3) respectively corresponding to the inner shackles (9) are evenly distributed on an inner wall of the transparent tube (1) along the circumferential direction, the outer shackles (3) and the inner shackles (9) are at a same height, and any pair of adjacent outer shackles (3) are spaced at equal angles, the inner shackles (9) and the outer shackles (3) are paired in pairs, and each pair of one inner shackle (9) and one outer shackle (3) are connected by a corresponding one of the spring dynamometers (2) that is tensioned;

when a central axis line of the circular valve core (4) coincides with a central axis line of the transparent tube (1) without tilting and twisting, all the spring dynamometers (2) are center-symmetrically distributed, and a tension force direction of each of the spring dynamometers (2) is parallel to the laser emission direction of a corresponding one of the laser sources (11) directly above it;

a tapered end of the diverging shaped tube (6) serves as a water inlet, and a diverging end is communicated with a bottom of the transparent tube (1), and there is no protrusion or depression at a joint between the diverging end and the bottom;

the high-speed camera (8) is movably placed outside of the transparent tube (1) and configured to surround the transparent tube (1) along the circumferential direction, to image postures of the circular valve core (4) and the spring dynamometers (2) in the tube at different orientations.

2. The measuring device for measuring an unbalanced moment of a bottom surface of a circular valve core according to claim 1, wherein a number of the spring dynamometers (2) is equal to 20, a number of the outer shackles (3) is equal to 20, a number of the inner shackles (9) is equal to 20, and a number of the laser sources (11) is equal to 20.

3. The measuring device for measuring an unbalanced moment of a bottom surface of a circular valve core according to claim 1, wherein the diverging shaped tube (6) has an arcuate shape to allow water to enter horizontally and to flow out vertically upwards.

4. The measuring device for measuring an unbalanced moment of a bottom surface of a circular valve core according to claim 1, wherein an inner diameter of the transparent tube (1) is greater than a sum of lengths of two of the spring dynamometers (2) and a diameter of the circular valve core (4).

5. The measuring device for measuring an unbalanced moment of a bottom surface of a circular valve core according to claim 1, wherein the bottom surface of the circular valve core (4) is provided with a plurality of bolt holes configured to fix an additional layer (5) of the bottom surface of the circular valve core (4).

6. The measuring device for measuring an unbalanced moment of a bottom surface of a circular valve core according to claim 1, wherein the high-speed camera (8) is erected on a camera stand (7).

7. The measuring device for measuring an unbalanced moment of a bottom surface of a circular valve core according to claim 1, wherein a top of the transparent tube (1) is communicated with the water tank (10).

8. The measuring device for measuring an unbalanced moment of a bottom surface of a circular valve core according to claim 1, wherein all the spring dynamometers (2) are the same in terms of model and size, and when the central axis line of the circular valve core (4) coincides with the central axis line of the transparent tube (1), and the circular valve core (4) is not tilted and twisted, all the spring dynamometers (2) exert a same tension force on the circular valve core (4).

9. The measuring device for measuring an unbalanced moment of a bottom surface of a circular valve core according to claim 1, wherein the transparent tube (1) is an acrylic tube.

10. A measuring method for measuring an unbalanced moment on a bottom surface of a circular valve core with the measuring device according to claim 1, the method comprising:

a step 1) of installing the circular valve core (4) to be measured in the measuring device in such a manner that the circular valve core (4) is suspended in the transparent tube (1) under tension forces of the spring dynamometers (2), and the central axis line of the circular valve core (4) coincides with the central axis line of the transparent tube (1), and the circular valve core (4) is not tilted and twisted;

a step 2) of keeping all the spring dynamometers (2) at a same height on a same horizontal surface, and recording current readings $F_0$ of all the spring dynamometers (2), where $F_0$ are readings indicated by pointers of the spring dynamometers (2), and the unit of $F_0$ is N;

a step 3) of feeding water into the transparent tube (1) through the diverging shaped tube (6) to impact the bottom surface of the circular valve core (4) by a water flow, until the circular valve core (4) reaches a stable state, using the high-speed camera (8) at a height directly and horizontally facing the circular valve core (4) to image, at different orientations around the transparent tube (1) in the circumferential direction, postures of the circular valve core (4) and the spring dynamometers (2); simultaneously recording a reading $F_n'$ of each of the spring dynamometers (2) and a reading $b_n$ of the positioning scale of laser light emitted by each of the laser sources (11) on the outer wall of the transparent tube (1), where $F_n'$ are readings indicated by pointers of the spring dynamometers (2) after the bottom surface of the circular valve core (4) is impacted by the water flow, and the unit of $F_n'$ is N, and $b_n$ are readings indicated by laser lights on the outer wall of the transparent tube (1);

a step 4) of obtaining, from the images of the high-speed camera (8) at different orientations, an angle $\beta_n$ between each of the spring dynamometers (2) and a vertical direction; simultaneously selecting, from the images, two of the laser sources that are located at two diameter ends in the cross-section of the circular valve core (4), determining, from the images, a point where a connecting line of the two laser sources intersects the central axis line of the valve core, and recording a scale, on a tube wall of the transparent tube, at the same height as the point as a reading a;

a step 5) of calculating differences between each $b_n$ and a, recording the $b_n$ corresponding to a largest difference in absolute value as $b_{max}$, and taking an orientation where the $b_{max}$ is obtained as an orientation in which the circular valve core (4) is twisted, in the image of the high-speed camera (8) corresponding to the orientation in which the circular valve core (4), obtaining a distance l between the outer wall of the transparent tube (1) and a circle center O of the cross-section of the circular valve core (4) where all the inner shackles (9) are located by measuring, then obtaining a torsion angle α of the circular valve core (4) according to a formula (1), and the torsion angle α being smaller than 90°:

$$\alpha = \arctan\left(\frac{b_{max} - a}{l}\right); \qquad (1)$$

a step 6) of calculating a component force $F_{1n}$ in a vertical direction of each of the spring dynamometers (2) according to a formula (2):

$$F_{1n} = F_n \times \cos \beta_n \qquad (2)$$

where $F_n = F_n' - F_0$;

a step 7) of measuring an angle $\gamma_n$ between a radius where each of the spring dynamometers (2) is located and a torsion central axis of the circular valve core (4), wherein the angle $\gamma_n$ is smaller than 90°, the radius where each of the spring dynamometers (2) is located is a connecting line between the circle center O and the inner shackle (9) connected to the spring dynamometer (2); calculating, according to a formula (3), a vertical distance $L_n$ between each of the spring dynamometers (2) and a vertical plane where the torsion central axis is located:

$$L_n = R \times \sin \gamma_n \times \cos \alpha \qquad (3)$$

where R is a radius of the cross-section of the circular valve core (4); and a step 8) of obtaining a total torque T of the circular valve core (4) by adding a torque generated by each of the spring dynamometers on a same side of the torsion central axis according to a formula (4):

$$T = F_{11} \times L_1 + F_{12} \times L_2 + \ldots + F_{1n} \times L_n \qquad (4).$$

* * * * *